Figure 1:
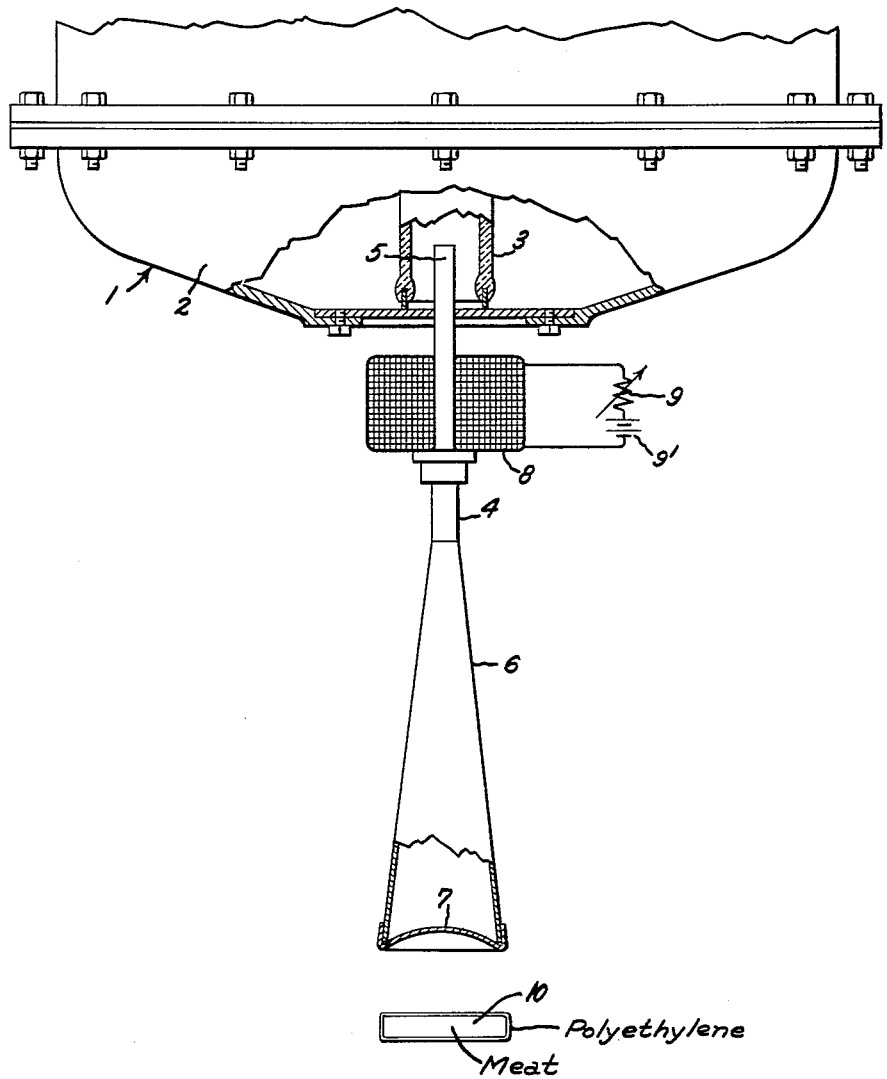

Fig. 2.
ELECTROPHORETIC PATTERN OF GLYCINE SOLUBLE PROTEIN
FROM NORMAL RABBIT MUSCLE
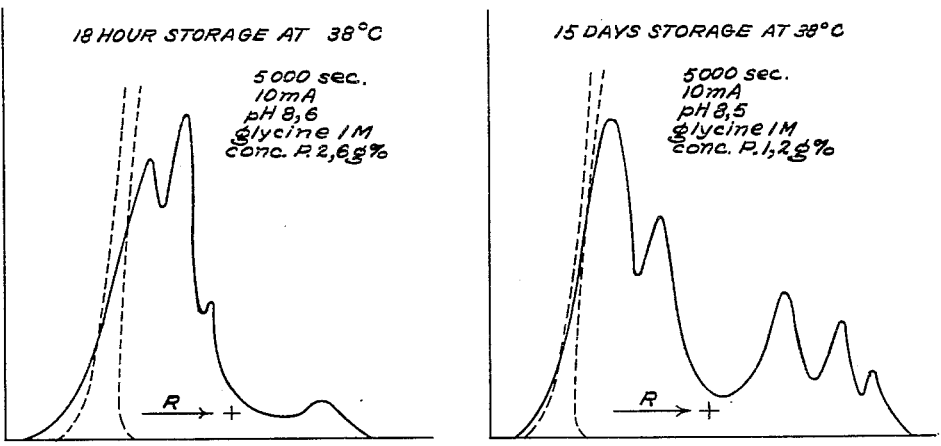
FROM ADRENALIZED 250 γ/Kg RABBIT MUSCLE
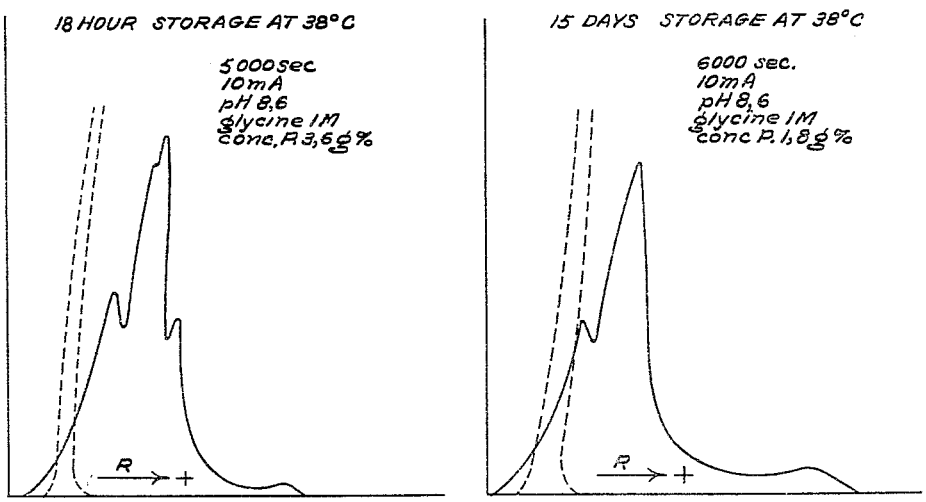

United States Patent Office

2,992,927
Patented July 18, 1961

2,992,927
PROCESS OF STABILIZING MEAT
Corneille Radouco-Thomas, Geneva, Switzerland, assignor to General Electric Company, a corporation of New York
Filed Dec. 4, 1958, Ser. No. 778,261
3 Claims. (Cl. 99—174)

This application is a continuation-in-part of my U.S. patent application Serial No. 680,525, filed August 27, 1957, for Food Process and Product, now abandoned. My present invention relates to meat stabilized against both bacterial and enzymatic deterioration. More particularly, this invention relates to a process of stabilizing meat against bacterial and enzymatic deterioration which comprises treating the animal with an agent capable of removing glycogen from animal muscles, for example adrenaline, prior to slaughter, slaughtering the animal after enough of the glycogen has been removed by the animal's metabolic processes to stabilize its meat at a pH of about 6.5–7.5, and then subjecting the meat of the slaughtered animal to ionizing radiation.

Two of the most important factors in the deterioration of meat are enzymes and bacteria.

Enzymes are complex protein-type chemicals which are found in all the cells of living organisms. These enzymes are necessary to catalyze reaction essential for the life activities such as reproduction, growth, digestion, etc. and enable the cells to control the speed and timing of these reactions so that they occur fast enough and at the proper time to be used by the body cells. When an animal dies, or when a cell is removed from its normal environment, this control is usually lost, and the enzymes are no longer kept in balance. For example, food is no longer delivered by the blood stream, waste products are no longer carried away Yet the enzymes continue to catalyze reactions, uncontrolled by the dead cells. Such reactions cause deterioration by ultimately dissolving or destroying the cells.

Bacteria also cause changes in meat which are undesirable not only because they cause unpleasant effects, such as odor or color changes, but also because many bacteria produce toxins or poisons which are often dangerous and sometimes deadly to human beings.

To prevent the above undesirable effects, enzymes and bacteria must either be killed or inactivated or their effects retarded so that they do not deteriorate meat.

One method of killing or inactivating both bacteria and enzymes comprises subjecting meat to ionizing radiation. However, enzymes are so resistant to destruction by radiation that they require dosages in excess of $10 \times 10^6$ rep. to completely inactivate them. The chemical and physical properties of food irradiated with such high doses are generally so altered that the food is less desirable commercially because of damage to cells, tissues and extreme changes in color, taste, odor, etc. Bacteria removal, on the other hand, requires on the order of only one-fifth or less of this large radiation dosage. For example, bacteria can be removed from meat by dosages of from one-half to 4 million rep. At such comparatively low dosages, the side effects on the physical and chemical properties of meat do not seriously affect the commercial acceptability of the product.

Stated another way, dosages required to kill bacteria do not sufficiently change the physical and chemical characteristics of meat in a manner that precludes commercial acceptance. In contrast, dosages required to inactivate enzymes are so high that commercial acceptance of the product is substantially precluded.

I have now discovered a method of stabilizing meat against both enzymatic and bacterial deterioration by a process which comprises treating the animal to be slaughtered with an agent capable of removing glycogen from animal muscles, for example, adrenaline prior to slaughter, slaughtering the animal after enough of the glycogen (for example at least 40% of that normally present) has been removed by the animal's metabolic processes to stabilize its meat at a pH of 6.5–7.5, and then subjecting the meat of the slaughtered animal to ionizing radiation.

The significance of this invention is that meat can be preserved by such low doses of radiation that the undesirable side effects of radiation are minimized. As Example 1 shows the adrenalization treatment alone will inactivate the enzymes so that meat may be stored for long periods of time without spoiling provided that the slaughtering, preparation of the meat, and storage are carried out under completely aseptic conditions. It is readily apparent, however, that for normal means of slaughtering, meat distribution, and storage, it is impossible to maintain aseptic conditions. Unexpectedly, I have discovered that, although neither process is effective and practical by itself, an effective and practical method could be obtained by combining the adrenalization treatment with radiation sterilization. Surprisingly, I found that when the two treatments were combined there was apparently a synergistic action which not only permitted relatively long periods of storage of the meat but also gave a product which did not have any of the undesirable side effects, such as the development of an unacceptable taste and odor from the radiation doses used in combination with adrenalization treatment. The desirable effects obtained are much greater than those one would expect to obtain by mere combination of an adrenalization treatment and an irradiation treatment. Furthermore, by prepackaging the meat in sealed containers prior to the radiation treatment subsequent contamination by bacteria is completely eliminated. When an extremely long storage period is desired, the packaging material used should be impermeable to gases and the gas space within the container should be completely devoid of oxygen.

The features of the invention desired to be protected are pointed out with particularity in the appended claims. The invention itself, together with further advantages may best be understood by reference to the following description taken in connection with the accompanying drawing in which:

FIG. 1 is a partially sectionalized, simplified view of an electron accelerator apparatus useful in practicing the invention; and FIG. 2 describes the electrophoretic pattern of glycine soluble protein from normal and adrenalized rabbits.

In general, the process of this invention is carried out by injecting a sufficient dose of adrenaline or another adrenaline-like agent into the animal to be slaughtered to stimulate the removal of glycogen. After a sufficient time has elapsed for enough of the glycogen to have been removed by the animal's metabolic processes to stabilize its meat at a pH of about 6.5–7.5, the animal is slaughtered. This treatment is so effective that enzymatic degradation of adrenalized meat can be detected only after weeks of storage at room temperature providing aseptic conditions have been maintained so that there is no bacterial action. Although it must be realized that the doses injected and the elapsed times prior to slaughter will depend on the individual animal slaughtered, the muscular glycogen level in the animal, the particular adrenaline-like agent employed, etc., in the case of adrenaline (as adrenaline chlorohydrate), doses of 100 to 1,000 gamma/kg. or greater, but preferably 150 to 500 gamma per kilogram of animal weight injected about 1 to 24 hours or longer, but preferably 4 to 8 hours prior to slaughter can be employed.

The process of this invention can be applied to a wide variety of animals, for example rabbits, cattle, sheep, goats, pigs, poultry, and other edible animals. Because adrenaline and other adrenaline-like materials are rapidly metabolized by the enzymatic processes of oxidation and conjugation in the animal, they are removed from the meat prior to use. Since adrenaline is present in practically all of the organs and tissues of all animals, including man, residual traces are harmless. Stabilized meat produced by this process can be handled in any manner heretofore known.

It is obvious to those skilled in the art that the optimum radiation dosage depends on the particular animal from which the meat is derived and the dose amount (gamma/kg.) of adrenaline used. By irradiating the adrenalized meat in a suitable container, for example, a metal can, a plastic container, such as polyethylene, polyvinyl chloride, Saran, etc., the meat is protected from contamination subsequent to irradiation.

Adrenaline or another adrenaline-like agent injected into the animal stimulates the conversion of muscle glycogen to glucose-1 phosphate (also known as Cori ester). During the life of the animal glucose-1-phosphate is eliminated by any or all of the following metabolic processes:

(1) By conversion to pyruvic acid which in turn will be oxidized to $CO_2$ or resynthesized to glycogen in the liver;
(2) By conversion to glycogen in the liver and stored there;
(3) Through the kidneys;
(4) By the conversion to lactic acid which is excreted in the urine.

However, after death, glycogen remaining in the muscles is broken down into lactic acid. Apparently, it is this build-up of lactic acid in the muscle which, among other things, causes a pH drop to the acid side, for example, 4.0–6.0 which is the optimum range at which enzymes cause the proteolytic breakdown of meat.

By injecting adrenaline into the animal prior to slaughter sufficient glycogen is removed while the animal is still alive, to prevent a drop in pH in the muscles after slaughter. By such injection, the pH of the slaughtered meat is kept about neutral (i.e. a pH 6.5–7.5) at which pH very little enzymatic degradation occurs even when stored at room temperature.

The amount of glycogen that may be permitted to remain in the muscles of the animal at the time of slaughter without rendering its meat acidic on storage will, of course, depend on the particular animal. However, in practice, it is desirable to remove at least 40%, but preferably at least 50% (i.e. 50–100%) of the glycogen which is normally present in the animal's muscles. It is not necessary to remove all of the glycogen from the muscle, since the remaining glycogen induce only a small drop in pH (0.5–0.7$\mu$ pH), through the post mortem formation of lactic acid. This decrease is not sufficient to permit the proteolytic activity of cathepsins of the muscle. It is also possible that various compounds present in the animal's muscle can neutralize or act as a buffer for the acidity caused by this decreased amount of lactic acid.

Thus, adrenaline or another adrenaline-like (i.e. sympathomimetic) agent can be employed. Therefore, in addition to adrenaline, adrenaline-like agents, for example, synephrine, levarterenol, amphetamine, dextroamphetamine, phenylephrine, isoproterenol, ephedrine, thyroid and pituitary hormones can also be employed. Moreover, in addition to these agents, it should be realized that any other agents capable of removing glycogen can also be employed.

In FIG. 1 of the drawing, there is shown high voltage accelerating apparatus 1 capable of producing a beam of high energy electrons for irradiating adrenalized meat in accordance with the invention. High voltage accelerating apparatus 1 may be of the type disclosed in Patent 2,144,518, Westendorp, assigned to the same assignee as the present application. In general, this apparatus comprises a resonant system having an open magnetic circuit inductance coil (not shown) which is positioned within a tank 2 and energized by a source of alternating voltage to generate a high voltage across its extremities. At the upper end (not shown) of a sealed-off, evacuated, tubular envelope 3 is located a source of electrons which is maintained at the potential of the upper extremity of the inductance coil, whereby a pulse of electrons is accelerated down envelope 3 once during each cycle of the energizing voltage when the upper extremity of the inductance coil is at a negative potential with respect to the lower end. Further details of the construction and operation of high voltage accelerating apparatus 1 may be found in the aforementioned Westendorp patent and in "Electronics," vol. 17, pp. 128–133 (December 1944).

To permit utilization of the high energy electrons accelerated down envelope 3, there is provided an elongated metal tube 4, the upper portion 5 of which is hermetically sealed to tank 2, as illustrated, by any convenient means, such as silver solder. The lower portion 6 of tube 4 is conical in cross-section to allow an increased angular spread of the electron beam. The emergence of high energy electrons from tube 4 is facilitated by an end-window 7 which may be hermetically sealed to tube 4 by means of silver solder. End-window 7 should be thin enough to permit electrons of desired energy to pass therethrough but thick enough to withstand the force of atmospheric pressure. Stainless steel of about 0.002 inch thickness has been found satisfactory for use with electron energies above 230,000 electron volts or greater. Beryllium and other materials of low stopping power may also be employed effectively. By forming end-window 7 in arcuate shape as shown, greater strength for resisting the force of atmospheric pressure may be obtained for a given window thickness. Desired focussing of the accelerated electrons may be secured by a magnetic-field generating winding 8 energized by a source of direct current 9' through a variable resistor 9.

In producing irradiated adrenalized meat according to this invention using high energy electrons as the source of ionizing radiation, a piece of adrenalized meat 10 wrapped in a suitable wrapping material, such as polyethylene, polyvinyl chloride, Saran, etc., or in a metal can, can be supported in the path of the electrons emerging from end-window 7 as illustrated. The high energy electrons penetrate the meat to a depth dependent upon their energy and effect the above modifications in the properties of the material. Of course, the meat 10 can be passed continuously under end-window 7 at a velocity selected to give the desired radiation dosage. Uniform treatment of meat having appreciable thickness can be assured by irradiating the meat first from one side and then the other or in some cases from both sides simultaneously. In certain instances, it may be desirable to irradiate the meat in an atmosphere of nitrogen, argon, helium, krypton or xenon, etc., to prevent the effect of any corona oxidation which may be present.

The most commonly employed units for measuring ionizing radiation are (1) Roentgen units and (2) Roentgen equivalent physical units. Roentgen units are more commonly used to measure gamma and X-rays and are usually defined as the amount of radiation that produces one electrostatic unit of charge per milliliter of dry air under standard conditions. The Roentgen equivalent physical unit (the "rep.") is a convenient unit which usually describes the radiation dose from other than gamma or X-rays, and is the measure of ionization in the absorber or tissue. The ionization produced by primary radiation is expressed as one rep. when the energy lost in tissue is equivalent to the energy lost by the absorption of one Roentgen of gamma or X-rays in air. Further definitions of "Roentgen" and "rep." can be found on p. 256 of "The Science and Engineering of Nuclear Power" edited by Clark Goodman (1947) and on p. 436 of "Nuclear Radiation Physics," by Lapp and Andrews (1948). For convenience, the term "Roentgen equivalent physical" or "rep." will be used in the specification and appended claims.

It will be readily realized that other forms of electron accelerating apparatus may be employed instead of high voltage apparatus 1, for example, linear accelerators of the type described by J. C. Slater in the "Reviews of Modern Physics," vol. 20, No. 3, pp. 473–518 (July 1948), may be utilized. To decrease wasteful energy absorption between the point of exit of electrons from the accelerating apparatus and the meat, a vacuum chamber having thin entrance and exit windows may be inserted in the space.

In general, the energy of the radiation preferably employed in the practice of my invention may range from about 50,000 to 20 million electron volts or higher depending upon materials. The preferable range is 100,000 to 10 million electron volts. Although a beam of high energy electrons is the preferred source of ionizing radiation since it produces a large amount of easily controllable ionizing ratiation within a short period of time without rendering the product radioactive, many other sources of ionizing radiation can be used in my invention. Examples of such radiation sources are gamma rays, such as can be obtained from $Co^{60}$, "burnt" uranium slugs, fission by-products, such as waste solution, separated isotopes, such as $Cs^{137}$, gaseous fission products liberated from nuclear reactions, etc.; other electron sources, such as the betatron, etc.; X-rays; and other miscellaneous sources, such as a Van de Graaff generator.

The suitable radiation dose employed in carrying out this invention will of course depend upon the meat irradiated and the type and number of bacteria present and the temperature to be used in storing the meat. Preferably the dose should be as low as possible consistent with preventing the bacterial destruction of the meat at the temperature of storage to be used. Thus, doses of above $1.0 \times 10^6$ rep., for example, from about $1.0 \times 10^6$ rep. to $8 \times 1.0$ rep. but preferably not above $6 \times 10^6$ rep. should be employed. For storage of meat for reasonable length of time, for example 3 to 4 weeks at an ambient temperature of about 25° C., a radiation dose of 2 to $3 \times 10^6$ rep. is satisfactory when combined with an adrenaline dose of about 200 to 300 gamma/kg. Storage at a substantially lower temperature would not require as high a dose whereas storage at a substantially higher temperature would require a greater dose. This is in marked contrast to the high doses required to inactivate enzymes which require in excess of $10 \times 10^6$ rep. to completely inactivate the enzymes. The irradiation can be carried out at room temperature, below room temperature, for example in a frozen state, or above room temperature.

In order that those skilled in the art may better understand how the present invention may be practiced, the following examples are given by way of illustration and not by way of limitation. All parts are by weight. The apparatus employed in irradiating meat was that described in the drawing with 800 kvp. electrons (kvp. refers to the peak voltage in kilovolts generated by the inductance coil with high voltage apparatus 1 during the conducting half cycle and thus is a measure of the energy emerging from window 7).

Example 1 is given to aid in a better understanding of the action of the adrenaline treatment. Since the tests were carried out under aseptic conditions, there was no bacterial contamination.

EXAMPLE 1

Rabbits weighing approximately 3 kilograms are injected intra-muscularly with adrenaline (adrenaline chlorohydrate 1:1,000 isotonic solution stabilized with 0.5% chloretone) four hours before slaughter. Muscles obtained under aseptic conditions from these slaughtered adrenalized animals are maintained at 38° C. under sterile anaerobic conditions to avoid bacterial effects and observed and tested over 0–15 days. To compare results, the meat of slaughtered, untreated rabbits similarly obtained and stored is used as controls. The weights given are the actual weights of adrenaline chlorohydrate employed per kilogram of animal weight. The unit of weight employed is gamma ($\gamma$) which is one-millionth of a gram, i.e., a microgram.

I. Results on Muscle Metabolism

A. *pH of rabbit muscle*

The pH of the rabbit muscles are measured immediately after slaughter (0 hour), after the normal establishment of rigor mortis (18 hours) and after 15 days' storage at 38° C. These results are presented in Table I.

TABLE 1.—pH OF RABBIT MUSCLE (AFTER ADRENALINE INJECTIONS)

| Dose of adrenaline | 0 hour | 18 hours' storage, 28° C. | 15 days' storage, 38° C. |
| --- | --- | --- | --- |
| 0γ/kg | 6.7 | 5.2–5.5 | 5.7 |
| 250γ/kg | 7.5 | 6.7 | 6.7 |

The above results show that the pH of the untreated animals drops rapidly to about 5.5 as rigor mortis established itself in muscles. In contrast, in the muscles of rabbits having received doses of 250γ/kg. of adrenaline, the pH drops only from 7.5 to 6.7 and remains constant during the 15 days' storage period.

B. *Glucose level in rabbit blood*

In order to show the action of adrenaline injections on glycogen metabolism, the glucose level in the blood of 5 rabbits was measured just before slaughtering. The results are shown in Table 2.

TABLE 2.—GLUCOSE LEVEL IN THE BLOOD OF RABBITS (4 HOURS AFTER INJECTION)

| Adrenaline dose | Glucose, mg. percent |
| --- | --- |
| 0γ | 82 |
| 0γ | 74 |
| 50γ/kg | 101 |
| 250γ/kg | 187 |
| 250γ/kg | 198 |

As indicated by this table, rabbits having received doses of 50 or 250γ/kg. of adrenaline show a definite increase of the glucose blood level. A parallel rise in blood lactic acid of the live adrenalized animals is also observed.

Aminoacids and proteins are determined in the following manner. The muscle is ground and extracted in a Waring Blendor for 5 minutes at 0° C. with 1 M glycine buffer at pH 8.6. This extract includes all the material listed in Tables 3 and 4. After extraction with glycine, the glycine buffered material is diluted once with distilled water and then with trichloracetic acid (10%). Extracted proteins (Table 4) remain soluble when the extract is diluted with water but precipitates when diluted with trichloracetic acid (10%); aminoacids (Table 3) remain soluble both in the water and the trichloracetic acid (10%) diluted extract.

The aminoacids and the glycine-soluble proteins are determined by the ultra-violet absorption of the extract diluted respectively with trichloracetic acid and with water. The ultra-violet absorption of the extract is called the tyrosine tryptophane index, as these two aminoacids either free or bound to proteins contribute most of the absorption at 279 millimicrons (mμ). However, it is important to remember that these are indications of the sum of total glycine soluble proteins (GSP), and of total free aminoacids. Tyrosine and tryptophane are in fact only a small fraction of the total aminoacids either free or bound to proteins. But they are generally presumed and particularly in this test to be a constant fraction, as verified by Kjeldahl analysis. Thus, these arbitrary numbers give a measure of the total glycine soluble proteins and free aminoacids soluble in trichloracetic acid (10%). The amount of free aminoacids is an indication of the degradation of the muscular large proteins into their aminoacids components. Protein macromolecules containing more than 3 or 4 aminoacids units would not be soluble in trichloroacetic acid (10%).

The purpose of these tests is to show that the glycine soluble or the glycine-insoluble protein fractions are converted to aminoacids and polypeptides by proteolysis or autolysis of the muscle.

C. Aminoacids in rabbit muscle

The free aminoacid level in the muscle during storage both at 18 hours, storage (i.e. after the establishment of rigor mortis) and at 15 days' storage are measured. This is reported as the tyrosine tryptophane index at 279 m$\mu$. This is a standard test given to measure aminoacids resulting from protein hydrolysis. The results are presented in Table 3.

TABLE 3.—AMINOACIDS IN RABBIT MUSCLE
[Tyrosine tryptophane index at 279 m$\mu$ (after adrenaline injection)]

| Dose of adrenaline | 18 hours' storage at 38° C. | 15 days' storage at 38° C. |
|---|---|---|
| 0γ/kg | 2,600 | 13,000 |
| 0γ/kg | 2,000 | 16,000 |
| 0γ/kg | 4,900 | 16,200 |
| 50γ/kg | 3,300 | 9,000 |
| 250γ/kg | 3,900 | 5,000 |
| 250γ/kg | 4,900 | 5,200 |

These results show clearly enough that the aminoacid level is not increased appreciably during 15 days' storage at 38° C. for rabbits having received doses of adrenaline of around 250γ/kg. In contrast, control rabbits show a pronounced increase in their free aminoacid level. Rabbits having received doses of adrenaline of 50γ/kg. present after 15 days' storage intermediary values for free aminoacids. From these results, it is evident that by varying the doses of adrenaline one can influence quantitatively the aminoacid level during storage, i.e., proteolysis and tenderization of the treated meat.

D. Proteins in rabbit muscle

Glycine soluble proteins (GSP) in rabbit muscle have been determined following adrenaline injections. Results are summarized in Table 4.

TABLE 4.—PROTEINS IN RABBIT MUSCLE
[Tyrosine tryptophane index at 279 m$\mu$ (after adrenaline injection)]

| Dose of adrenaline | 18 hours' storage at 38° C. | 15 days' storage at 38° C. |
|---|---|---|
| 0γ/kg | 14,600 | 14,500 |
| 0γ/kg | 13,500 | 13,800 |
| 50γ/kg | 19,100 | 12,000 |
| 250γ/kg | 26,100 | 10,000 |
| 250γ/kg | 24,100 | 12,300 |

The effect of adrenaline on muscle proteins is primarily characterized by an increase of GSP in the hours which follow death (18 hours). In fact, these results show that muscle, after injections of adrenaline, does not reach rigor mortis. Its proteins remain quite soluble. However, after 15 days' storage, half of the original GSP have become insoluble. This insolubilization is connected with some hardness of the meat at 15 days' storage. This hardness is roughly proportional to adrenaline doses injected.

E. Electrophoretic pattern of GSP

Electrophoresis has been developed as a method for determining the homogeneity of charged solutes such as proteins. The distance that a charged particle will migrate in an electric field depends upon several factors, including: size and shape of the particle, nature and viscosity of the solvent, the number and sign of the charges per particle, etc. A single component will produce a single boundary curve. Mixed solutes will produce multiple peaks.

In practice, the protein mixture is caused to migrate into a clear buffer solution in a glass cell. By means of a suitably designed optical system, a beam of light passing through the solution is focussed on a photographic plate which translates the differences in refraction to the curves shown in FIG. 2. These curves are the standard Schleren photographs of the boundary patterns formed by the separating protein fractions. They are a plot of the $dn/dx$ vs. $x$, where:

$n$=refractive index
$x$=distance from original boundary

The dotted lines represent the Schleren pattern for time 0. The peaks represent regions of rapidly changing protein concentration (i.e. areas of large concentration gradient and boundary regions between components).

The electrophoretic pattern of glycine soluble proteins in the control rabbits in FIG. 2 presents the usual modifications found after 18 hours' and 15 days' storage at 38° C. In contrast, in rabbits having received doses of 250γ/kg., one does not observe the new electrophoretic peaks which are so typical of proteolysis under the control conditions. The absence of these new peaks indicates little proteolysis. It is clearly apparent that the GSP from normal muscle after 15 days' storage at 38° C. contains many more components than the corresponding GSP from adrenalized rabbit muscle. This indicates much more degradation of the proteins in the normal muscle.

The electrophoretic data added to the previous observations on free aminoacid stabilization in adrenalized samples confirms that proteolysis has hardly begun in the adrenalized animal. Differences between electrophoretic diagram at 18 hours and 15 days observed both for control and adrenalized animals can be explained by the insolubilization of half of the GSP.

The procedure employed is a standard procedure described in "Proteins," vol. I, part A, edited by Neuroth et al. (Academic Press, 1953), pp. 497–502.

II. MACROSCOPIC OBSERVATIONS

A. Elasticity

Muscles from control animals lose all their elasticity after 18 hours. At that moment, they are in full rigor mortis and thus relatively tough. After 15 days at 38° C., however, following proteolysis, the muscle becomes excessively tender.

In contrast, muscles coming from animals having received doses of either 50 or 250γ/kg. of adrenaline retain most of their elasticity and tenderness after 18 hours. After 15 days' storage, at 38° C., they become quite firm, although non-contracted and still elastic.

When one compares the samples from rabbits having received doses of 250γ/kg. of adrenaline to those having received a dose of 50γ/kg., one finds that the 50γ dosage is less firm after 15 days than the 250γ one. This is in agreement with the above observations.

B. Exudation

With regard to the process of exudation, the sections of adrenalized meat do not exude as much as the normal sections. This is shown in Table 5.

TABLE 5.—EXUDATION OF RABBIT MUSCLE

| Dose of adrenaline | Volume of exudate for 100 gr. muscle after 15 days' storage at 38° C., cc. |
|---|---|
| 0γ/kg | 17.0 |
| 0γ/kg | 14.0 |
| 0γ/kg | 15.0 |
| 50γ/kg | 2 |
| 250γ/kg | 1 |
| 250γ/kg | 0 |

From this table it is evident that muscles having received 50γ/kg. or 250γ/kg. doses do not exude appreciably. In fact, this meat seems to have kept all its lyophilic properties. Little exudation indicates that little, if any, enzyme proteolysis and tissue breakdown had taken place in the adrenalized muscle.

A. *Anatomic dissection under microscope*

The results of the anatomic dissection are shown in Table 6.

TABLE 6

|  | After 18 hours at 38° C. | After 14 days at 38° C. |
|---|---|---|
| Control non-adrenalized. | Hardened fibres non extensible, non-easy to dissect in separated long fibres. | Excessive tenderness: the meat smashed with needles and disintegrates in SGH [1] liquid suspension which look turbid. |
| 50γ/kg. adrenalized. | Long extensible fibres, quite easy to separate in spite of elasticity. | Hardened fibres still a little extensible, quite easy to dissect in bundles of straight fibres, SGH [1] liquid suspension is clear. |
| 250γ/kg. adrenalized. | Very long extensible fibres, very easy to separate into long elastic fibres. | Hardened fibres still a little extensible, easy to dissect in long elements. SGH [1] suspension is clear. |

[1] Described in "Chemistry of Muscular Contraction" (1951, p. 28, Acad. Press, N.Y.).
SGH refers to the following mixture: (1) one part of Szent-Gyorgz 50–50 (by weight) glycerol water solution, (2) one part of Hodges Solution (0.1 N KCl, 0.001 M MgCl₂).

B. *Microscopic structural aspect*

TABLE 7

|  | After 18 hours at 38° C. | After 14 days at 38° C. |
|---|---|---|
| Control non-adrenalized. | Normal in size and shape, indented walls in straight fibres. Classical band pattern with regular intervals between striations. | Flattening and granular deterioration of the still structured fibres. Disintegration of myofibrils, containing areas of complete deterioration. Ratio of deteriorated areas to non-deteriorated areas 2:1. |
| 50γ/kg. adrenalized rabbit muscle. | Normal in size and shape; linear walls on straight fibres; aspect of both contraction and stretching on classical band pattern. | Normal in size and shape. Straight and indented fibres. Well kept band pattern aspect; little deterioration; deteriorated: non - deteriorated areas 2:100. |
| 250γ/kg. adrenalized rabbit | Normal in size and shape; linear walls on straight fibres. Both aspect of contraction and stretching on classical band pattern, more frequent and acute than above. | Normal in size and shape. Dominant straight fibres, very few indented fibres. Well kept band pattern even on stretched zones; no deterioration. |

From Tables 6 and 7 it is evident that the fibres of adrenalized meat are protected against deterioration for long periods of time.

C. *Cytologic structure*

Cytologic structure of muscle after 18 hours at 38° C. is observed.

(a) The process of normal post-mortem contraction is observed on controls as evidenced by the shortening of the intervals between the bands of the classical striated structure. No stretching is visible, all the bands are regularly spaced.

(b) In contrast, on adrenalized meat, especially with the 250γ doses, a cytologic proof of residual elasticity appears in the shape of alternate features of contraction and stretching on the same fibre.

It seems thus that adrenaline acts as a rigor mortis antagonist and stabilizes the vital elasticity of fresh muscle.

In regard to the detailed cytologic structure after 14 days, the next table summarizes the numerical results and emphasizes differences between control and adrenalized muscle.

TABLE 8

| 14 days at 38° C. | Percent muscle straight fibres | | | | Fibres (rabbit) indented fibres | | | | Ratio of areas of deterioration to nondeterioration |
|---|---|---|---|---|---|---|---|---|---|
|  | Total | // | // | ::::: | Total | // | // | :::::[1] | |
| Control | [2]96 | 5 | 15 | 80 | [2]4 | 0 | 8 | 92 | 2:1 |
| Adrenalized 50γ/kg | 68 | 88 | 11 | 1 | [2]32 | 88 | 12 | 0 | 2:100 |
| Adrenalized 250γ/kg | 72 | 95 | 5 | 0 | [3]28 | 93 | 6 | 1 | 0 |

[1] // // ::::: =main features, instriations:continuous, hyphened:granular.
[2] Very short fragments; numeration has been done on a large number of slides.
[3] Very short indentations, very few accordion shaped.

Summarizing the microscopic data, normal muscle after storage at 38° C. for 14 days, has little organized muscular structure, i.e., the muscular fibres have been destroyed and the muscle is now amorphous since all striations have disappeared from the fibres. With the 50γ/kg. adrenalized muscle after 14 days at 38° C., a large fraction of the muscle fibres are still intact. They show striations and small areas of destruction, but they are largely intact. With the 250γ/kg. adrenalized muscle there is a high percentage of intact muscle. With 50γ/kg. 88% of the muscle fibres were striated and intact while at 250γ/kg. 95% was intact. Stated another way, after 14 days at 38° C., while two-thirds of the muscle in the control has deteriorated, only 2% of the muscle of the 50γ/kg. adrenalized muscle had deteriorated, and practically 0% of the 250γ/kg. adrenalized muscle had deteriorated.

In addition to rabbits, similar improvements are noted when cattle, sheep, goats, pigs, and poultry are injected with adrenaline and treated in a similar manner.

The following examples illustrate the synergistic action obtained by combining the adrenalization treatment with irradiation. It is to be noted that in these examples the slaughtering was done under sanitary conditions normal to commercial slaughterhouses rather than the aseptic conditions of Example 1.

EXAMPLE 2

Two pullets about one year old and weighing 6–7 pounds were used. One was used as a control and the other was injected with 250 gamma/kg. adrenaline using a 0.1 Normal HCl solution containing 1 milligram of adrenaline per ml. of solution. Four hours after the injection of the one pullet, both birds were slaughtered and the breast muscles cut up into pieces about ½" x 1" x 1" and sealed in polyethylene bags. The samples were irradiated from two sides using 1.5 million volt electrons from a resonant transformer to doses of 0, 0.67, 2.0, 3.0 and 6.0×10⁶ rep. using a rate of 33.300 rep./sec. A triplicate sample of both the adrenalized and non-adrenalized chicken was irradiated to each dose and stored at room temperature. An identical test was run with the samples stored at 35° C. All of the control samples of the chicken which had not been treated with adrenaline were completely unacceptable and had become putrid after 1–5 days' storage at 35° C. The samples of the adrenalized chicken which had been irradiated with 3.0 and 6.0×10⁶ rep. had no disagreeable odor either of irradiation or of decomposition. The control samples of the chicken which had not been treated with adrenaline but stored at room temperature had developed a strong putrid odor in a period of 2–12 days, except for the sample which had been irradiated with 6.0×10⁶ rep. The latter sample, however, had a very strong and disagreeable rancid fat and putrid odor. The samples of the adrenalized chicken which had been irradiated to 3 and 6×10⁶ rep. were firm and had no disagreeable odor at the end of 12 days.

EXAMPLE 3

A large Hereford steer was injected with approximately 110 gamma/kg. of adrenaline and slaughtered in the usual manner four hours later. After the carcass had hung for seven days, it was cut up in the usual fashion and frozen as were also samples of similarly treated but non-adrenalized steer. Steak samples of both the control and adrenalized animal were thawed and cut into pieces ½″ x 2″ x 2″, and sealed in polyethylene bags, and irradiated to the same doses as used in Example 2. When stored at 35° C., all the control samples, including the one which had been irradiated to 6×10⁶ rep. became putrid within three days. The samples of the adrenalized meat which had been irradiated to 3 and 6×10⁶ rep. were still satisfactory and had no putrid odor at the end of of four days. The samples stored at room temperature showed similar results with only the adrenalized samples which had been irradiated with 3 and 6×10⁶ rep. being satisfactory after four days.

EXAMPLE 4

In this test, two pigs weighing about 170 pounds each were used. One was used as a control and the other was injected with 250 gamma/kg. of adrenaline in the usual fashion. The dorsal muscles were removed in each case and samples sealed in polyethylene bags and irradiated as in Example 2. Samples stored at 35° C. gave the following results: At the end of four days all of the control samples of the non-adrenalized pork, including those irradiated at 6×10⁶ rep. were putrid. However, of the adrenalized samples only the three which had received no radiation and two of the three samples which had been irradiated with 0.67×10⁶ rep. were putrid. The others had good odor and were firm. The samples stored at room temperature gave the following results: The samples of the non-adrenaline control which had been irradiated to 2×10⁶ rep. or less were putrid by the end of eight days. The samples of the control which had been irradiated with 3 and 6×10⁶ rep. showed evidence of decomposition at the end of 19 days. All of the adrenalized samples, except those which had not been irradiated were satisfactory at the end of 19 days.

The adrenaline treatment is specifically intended to retard the enzymatic destruction of protein (muscle). However, Examples 2–4 showed an additional unexpected result for the combination adrenaline and irradiation treatment in that the fat (a non-protein) was definitely stabilized against destruction and development of rancidity in all cases where the protein was also stabilized.

The foregoing detailed description has been given for clearness of understanding only and no unnecessary limitations are to be understood therefrom. The invention is not limited to the exact details shown and described, for obvious modifications will occur to those skilled in the art. For example, other means for preserving meats can also be employed in conjunction with the present invention, for example, the use of bacterial and enzyme inhibitors, antibiotics and chemical agents, heat, etc., the use of refrigeration, etc. Meat produced by the process of this invention can be prepared in any manner heretofore known and eaten by animals and human beings.

What I claim as new and desire to secure by Letters Patent of the United States is:

1. The process of stabilizing meat against bacterial and enzymatic deterioration which comprises removing glycogen from animal muscle prior to slaughter by treating the animal to be slaughtered with at least 100 gamma of a sympathomimetic compound per kilogram of body weight, slaughtering the animal after at least 40% of the glycogen has been removed by the animal's metabolic processes to stabilize its meat at a pH of 6.5–7.5, sealing the stabilized meat in a container and subjecting the meat of the slaughtered animal to ionizing irradiation having energy of at least 5×10⁴ electron volts to a radiation dose of at least 2×10⁶ rep.

2. The process of stabilizing meat against bacterial and enzymatic deterioration which comprises treating the animal to be slaughtered with at least 100 gamma of adrenaline per kilogram of body weight prior to slaughter, slaughtering the animal after at least 40% of the glycogen has been removed by the animal's metabolic processes to stabilize its meat at a pH of 6.5–7.5, sealing the stabilized meat in a container and subjecting the meat of the slaughtered animal to ionizing irradiation having energy of at least 5×10⁴ electron volts to a radiation dose of at least 2×10⁶ rep.

3. The process of stabilizing meat against bacterial and enzymatic deterioration which comprises treating the animal to be slaughtered with a dose of at least 200 gamma of adrenaline per kilogram of body weight prior to slaughter, slaughtering the animal after at least 40% of the glycogen has been removed by the animal's metabolic processes to stabilize its meat at a pH of 6.5–7.5, sealing the stabilized meat in a container and subjecting the meat of the slaughtered animal to ionizing irradiation having energy of at least 5×10⁴ electron volts to a radiation dose of at least 2×10⁶ rep.

References Cited in the file of this patent

UNITED STATES PATENTS

| | | |
|---|---|---|
| 81,185 | Lugo | Aug. 18, 1868 |
| 231,807 | Jones | Aug. 31, 1880 |
| 2,351,614 | Hills et al. | June 20, 1944 |
| 2,456,909 | Brasch | Dec. 21, 1948 |
| 2,786,786 | Deatherage | Mar. 26, 1957 |

OTHER REFERENCES

"The Condensed Chemical Dictionary" (1942), third ed., by T. C. Gregory, published by Reinhold Publishing Co., 330 N. 42nd St., New York, page 50, article entitled Adrenalin.